J. W. MIXTER.
SAW GUMMER.
APPLICATION FILED SEPT. 20, 1909.
963,793.
Patented July 12, 1910.
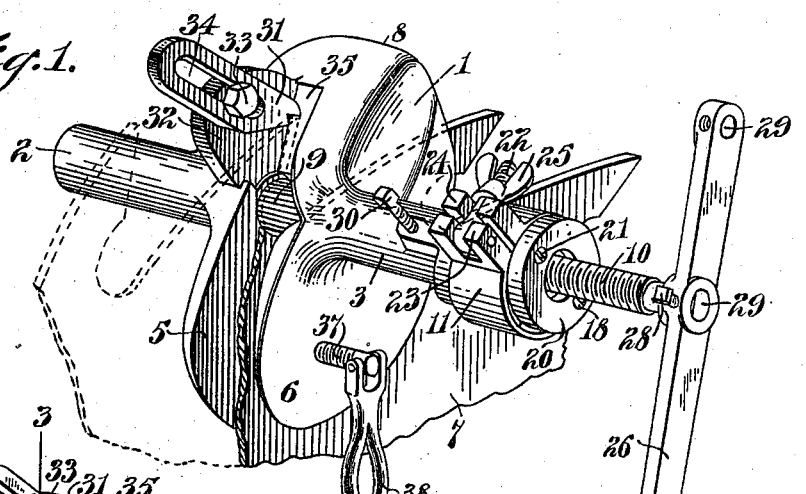
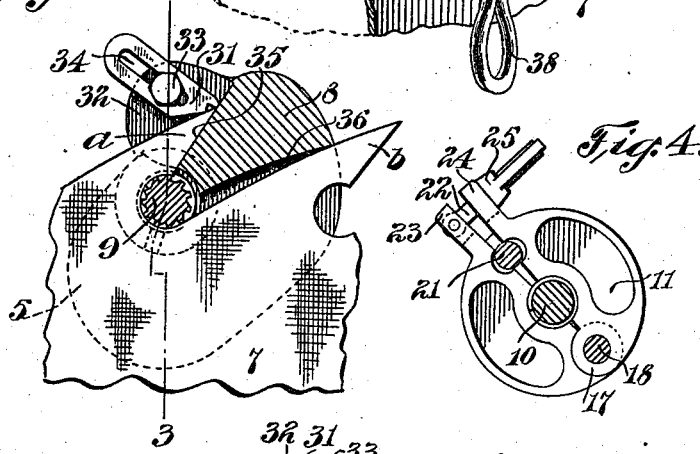
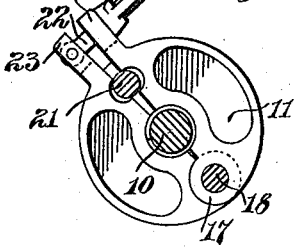
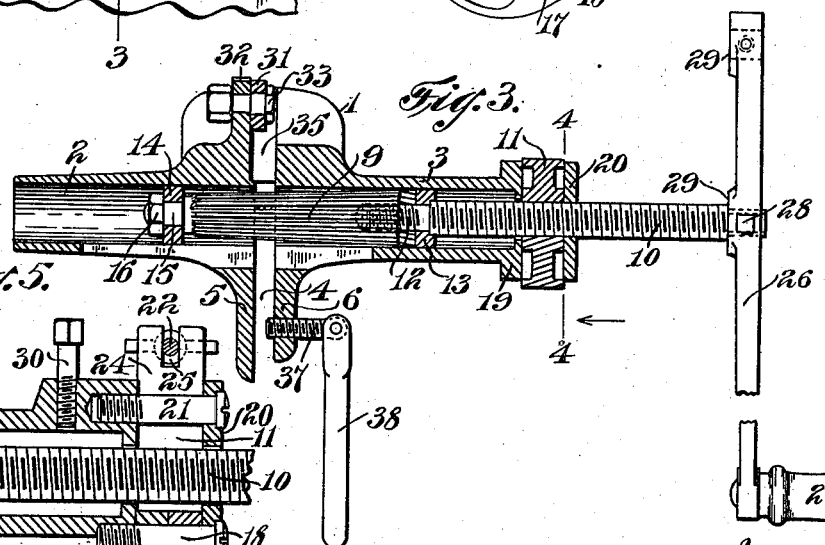
Witnesses:
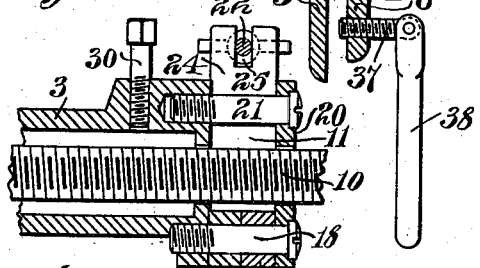
Inventor:
Jason W. Mixter

UNITED STATES PATENT OFFICE.

JASON W. MIXTER, OF PLYMOUTH, MASSACHUSETTS.

SAW-GUMMER.

963,793.   Specification of Letters Patent.   Patented July 12, 1910.

Application filed September 20, 1909. Serial No. 518,508.

*To all whom it may concern:*

Be it known that I, JASON W. MIXTER, of Plymouth, in the county of Plymouth and State of Massachusetts, have invented certain new and useful Improvements in Saw-Gummers, of which the following is a specification.

This invention relates to a machine for gumming saws by a reaming tool which is tapered and is fed in the direction of its axis transverse to the plane of the saw in action.

The object of the invention is to provide improvements in the construction of a saw gummer of this character which will permit separation of the reamer from its shank, which will permit an adjustment of the nut through which the threaded shank of the reamer is passed, which will permit supporting of the reamer at both ends thereof, to provide an improved form of gage for locating the gummer with respect to the saw, to provide an improvement in means for clamping the gummer upon the saw, and to furnish other improvements which will be hereinafter more fully described and claimed.

In the accompanying drawings Figure 1 represents a perspective view of a saw gummer made in accordance with my invention applied to a circular saw. Fig. 2 is a central section of the same. Fig. 3 is a longitudinal section of the gummer on line 3—3 of Fig. 2. Fig. 4 is a cross-sectional view enlarged on line 4—4 of Fig. 3, showing in elevation a nut or bearing for the threaded shank of the reaming tool. Fig. 5 is a longitudinal section.

The same characters indicate the same parts in all the figures.

The gummer consists of a body 1, preferably made as a metal casting, which has bearing sleeves 2 and 3 projecting from opposite sides in line with each other and centrally divided by a transverse slot 4. On each side of the slot are wings 5 and 6 which are adapted to embrace a saw 7, which wings are connected by a narrow neck 8 (Fig. 2), the shape of which is such as to permit it to lie between adjacent teeth of a saw when the latter is in the slot 4.

Extending through the bearing sleeves 2 and 3 is a reamer 9, which is adapted to be moved rotarily and axially. The reamer is tapered so that as it is moved in an axial direction it enlarges the recess which it makes in the saw. This reamer is detachably connected to a threaded shank 10, which extends beyond the end of the sleeve 3 and is held in a threaded bearing or nut 11. The attachment between the reamer and shank consists of a threaded stud 12 on the latter, which is screwed into the larger end of the reamer.

One of the important features of this invention is a provision for supporting both ends of the reamer so that it will not spring. In other words it is to provide a bearing for the larger end of the reamer between the extreme end of the latter, and the bearing or nut in which the screw shank is contained, it being understood that this shank is smaller than the bore of the sleeve 3 and does not bear on the walls of the latter. The supporting bearing for the large end of the reamer is a roll 13 which is journaled upon the shank 10 close to the large end of the reamer and is of a size causing it to fit the bore of the sleeve 3 and prevent deflection of the reamer. The other end of the reamer is supported by a roll 14 which is journaled upon a reduced extension 15 thereof and is secured in place by any convenient means such as a nut 16. These rolls bear upon the inner walls of the sleeves 2 and 3 and hold the reamer up to its work. The nut or bearing 11 of the shank 10 is made in two parts as shown in Fig. 4. These parts have overlapping ears or lugs 17 which are bored and receive a pivot pin 18 screwed into a collar 19 on the end of the sleeve 3, as shown in Fig. 5. A plate or washer 20 is placed outside of the nut and is held by the pivot pin 18 and by a second screw 21 which passes through notches in the halves of the divided nut. The parts of this nut can thus be separated to permit free endwise movement of the shank, without engagement with the threads thereof, and can be clamped together upon the threads of the shank to cause a screw feed thereof and of the reamer when the shank is turned. The clamping means for the parts of the nut is made so as to provide an adjustment by which wear on the threads of the nut may be taken up and the effective life of the nut indefinitely prolonged. This is one of the important features of my invention. A convenient, though not necessarily the only possible means for adjustably clamping the two parts of the nut together is shown in the drawing and consists of a threaded rod 22 pivoted between lugs or fingers 23, projecting from one of the halves of the nut, said pin being adapted to swing into and out of a slot in lug 24 projecting from the other part of the nut. Threaded upon this rod is a thumb nut 25, which can be turned up to draw the lugs 23 and 24 together and thereby bind the parts of the nut or bearing 11 against the shank 10. As fast as the threads of the bearing 11 are worn away the wear can be taken up by screwing the thumb nut 25 farther on the rod 22 and thus a close engagement between the threads of the bearing 11 and the shank 10 may be maintained.

The shank and reamer are rotated by means of a crank 26 having a handle 27 which is detachably mounted upon the outer end of the shank 10 and secured thereto by any suitable means as a set screw 28. There are two or more bearings 29 in the crank to receive the end of the shank 10, either of which may be used so as to increase or diminish the leverage which may be exerted upon the shank.

One of the important features of the invention is the provision which I make for readily separating the reamer from the shank so that it may be removed for any desired purpose, without requiring the entire shank to be removed with it. A successful embodiment of this provision is a screw 30 threaded into the sleeve 3. The shank 10 may be drawn outward until the reamer is brought in line with the screw 30, whereupon the latter may be screwed inwardly until it engages the teeth of the reamer. Outward rotation of the shank will then unscrew it from the reamer and allow the latter to be separately removed, without necessitating complete withdrawal of the shank 10, and without the use of a wrench.

Another important feature of the invention is an improved gage which has a twofold function, both to adjust the gummer in the proper position on the saw so that all the teeth of the saw can be gummed alike, and to hold the gummer in proper position on the saw. This gage is designated by 31 and is pivotally mounted upon an ear 32 of the gummer casting or body by means of a screw stud 33, which passes through a slot 34 in the gage into the said lug. The slot in the body or casting of the gummer is so shaped as to provide a surface 35, which is adapted to bear against the face of the tooth being gummed and the point of the gage coöperates with this surface 35. The gage is freely movable in all directions and can be adjusted to all lengths and pitches of saw teeth. In addition to the face 35 the slot 4 has a second bounding face 36, a portion of which is adapted to coöperate with the tooth next adjacent to that upon which the gummer is acting. In Fig. 2 of the drawings the tooth being operated on is indicated by $a$ and the next adjacent tooth by $b$. The face of the tooth $a$ bears against the face 35 of the gummer and the gage 31 bears against the point or back of that tooth. The next tooth $b$ bears at its back against a portion of the face 36, either against the extreme outer edge of this face, or against an intermediate portion, depending upon the length and pitch of the teeth. These surfaces, the gage and a clamp 37, coöperate to secure the gummer against displacement when the saw is being operated upon, while the surfaces and the gage when once adjusted enable all the teeth to be gummed exactly alike.

The clamp 37 above referred to is preferably a screw which is threaded through one member of the gummer casting and is adapted to be forced against a face of the saw. This clamp has a handle 38 pivoted to it. The handle is longer than the distance between the clamp and the bearing sleeve 3, and is therefore pivotally hung so that it may be swung more or less into alinement with the clamp to enable it to be carried past the sleeve. It can then be swung outward at right angles to the clamp to enable a spring leverage to be applied in forcing the clamp against the work. This provision of a pivoted handle upon the clamping screw enables a sufficient amount of leverage to be applied without the necessity of using a wrench or of making the gummer casting unnecessarily large to permit of the clamp being located at a comparatively great distance from the sleeve 3. The gage 31 coöperates with clamp 37 to prevent the gummer from riding up on the saw, due to the reaction of the reamer upon the part of the saw on which it acts.

I claim—

1. A saw gummer comprising a body having a bearing, a nut secured to said bearing, a screw-threaded shank of uniform diameter throughout its length engaged with said nut and projecting into the bearing, a reamer detachably connected to the inner end of said shank, and a roll engaging the inner surface of the bearing and surrounding the shank at the point where the latter is connected with the reamer, to provide an antifriction support at the junction of the shank and reamer.

2. A saw gummer having a tubular bearing, a reamer contained in said bearing, an operating shank having a threaded engagement with one end of said reamer and projecting from the end of said bearing, and means for engaging said reamer and holding the same stationary to permit disengagement of the shank therefrom.

3. A saw gummer having a tubular bearing, a reamer contained in said bearing, an operating shank having a threaded engagement with one end of said reamer and projecting from the end of said bearing, and a screw threaded transversely into said bearing and adapted to be brought into engagement with such reamer to hold the same stationary and permit the shank to be unscrewed therefrom.

4. A saw gummer comprising a body slotted to receive a saw, bearings extending oppositely from said body to contain a tool, and a clamp screw threaded into said body beside one of said bearings adapted to be forced against a saw contained in the slot, and a handle having width greater than the diameter of said screw and less than the distance between said clamp and bearing, and being of greater length than such distance, pivotally attached to the clamp to permit the same to be swung clear of the bearing in rotation of the clamp, and to be brought at right angles thereto for the purpose of obtaining a great leverage.

5. A saw gummer comprising a body having a slot to receive a saw and having bearings for a gumming tool, said body having wings bounding such slot and connected by a neck shaped conformably to the space between two saw teeth, and a gage mounted adjacent to one of the sides of said neck for locating the gummer in the proper position and at the proper angle for gumming a saw tooth.

6. A saw gummer comprising a body having a neck shaped to conform to the space between two saw teeth, and having bearings for a gumming tool, said neck being formed with a surface adapted to contact with the face of the tooth being gummed, a lug arranged adjacent to such surface, and a gage pivoted to said lug and movable relatively to its pivot to coöperate with said surface in locating and securing the gummer relatively to the tooth being gummed.

In testimony whereof I have affixed my signature, in presence of two witnesses.

JASON W. MIXTER.

Witnesses:
CHARLEE W. MIXTER,
ALFRED C. CHRISTIE.